United States Patent [19]

Burton

[11] 4,150,526
[45] Apr. 24, 1979

[54] COLLECTOR LEAF CONSTRUCTION FOR HARVESTING MACHINE

[75] Inventor: Charles G. Burton, Lewiston, N.Y.

[73] Assignee: Chisholm-Ryder Company, Inc., Niagara Falls, N.Y.

[21] Appl. No.: 848,398

[22] Filed: Nov. 4, 1977

[51] Int. Cl.² ............................................. A01D 46/00
[52] U.S. Cl. ........................................ 56/329; 56/330
[58] Field of Search ...................... 56/329, 330; 49/77; 267/69

[56] References Cited

U.S. PATENT DOCUMENTS

| | | | |
|---|---|---|---|
| 3,255,578 | 6/1966 | Pertics | 56/330 |
| 3,449,895 | 6/1969 | Pertics | 56/330 |
| 3,538,694 | 11/1970 | Holloway | 56/330 |
| 3,690,054 | 9/1972 | DeCarlo et al. | 56/330 |
| 3,760,574 | 9/1973 | Tassone | 56/330 |
| 3,866,401 | 2/1975 | Claxton et al. | 56/330 |

Primary Examiner—Louis G. Mancene
Assistant Examiner—Paul J. Hirsch
Attorney, Agent, or Firm—Joseph P. Gastel

[57] ABSTRACT

A collector leaf construction for a harvester consisting of a primary leaf portion, a pivot for mounting the inboard end of the primary leaf portion on the frame of a harvester, a secondary leaf portion, a pivot for mounting the secondary leaf portion on the outboard end of the primary leaf portion, a first spring between the primary leaf portion and the frame, a second spring between the primary leaf portion and the secondary leaf portion to permit the secondary leaf portion to deflect relative to the primary leaf portion when it encounters an obstruction, the first spring being stronger than the second spring, with the secondary leaf portion extending forwardly of the leading edge of the primary leaf portion so that when the primary leaf portion is deflected, the secondary leaf portion will occupy a part of the position previously occupied by the primary leaf portion to thereby cover any opening left by the primary leaf portion when it is deflected during harvesting, and any deflection of the secondary leaf portion will not be transmitted to the primary leaf portion because the second spring is weaker than the first spring.

18 Claims, 16 Drawing Figures

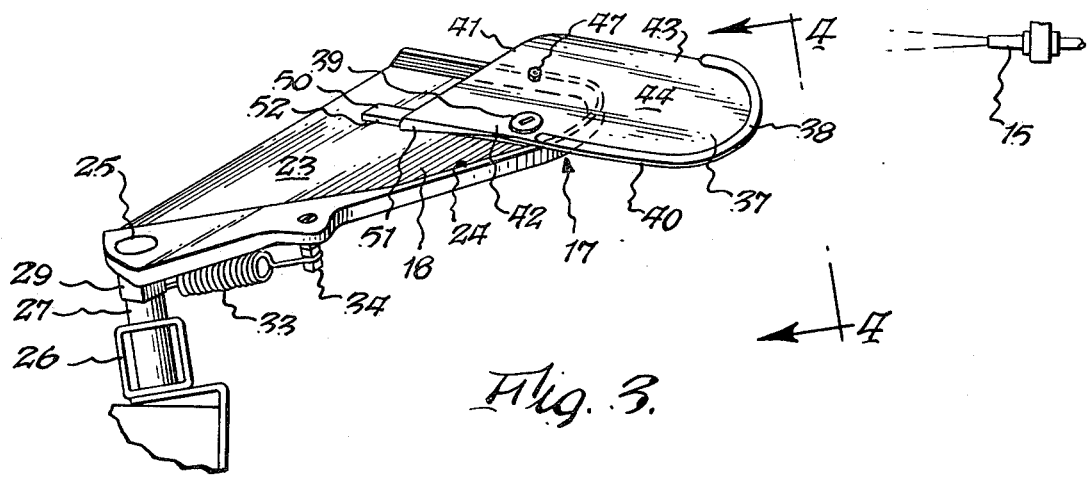
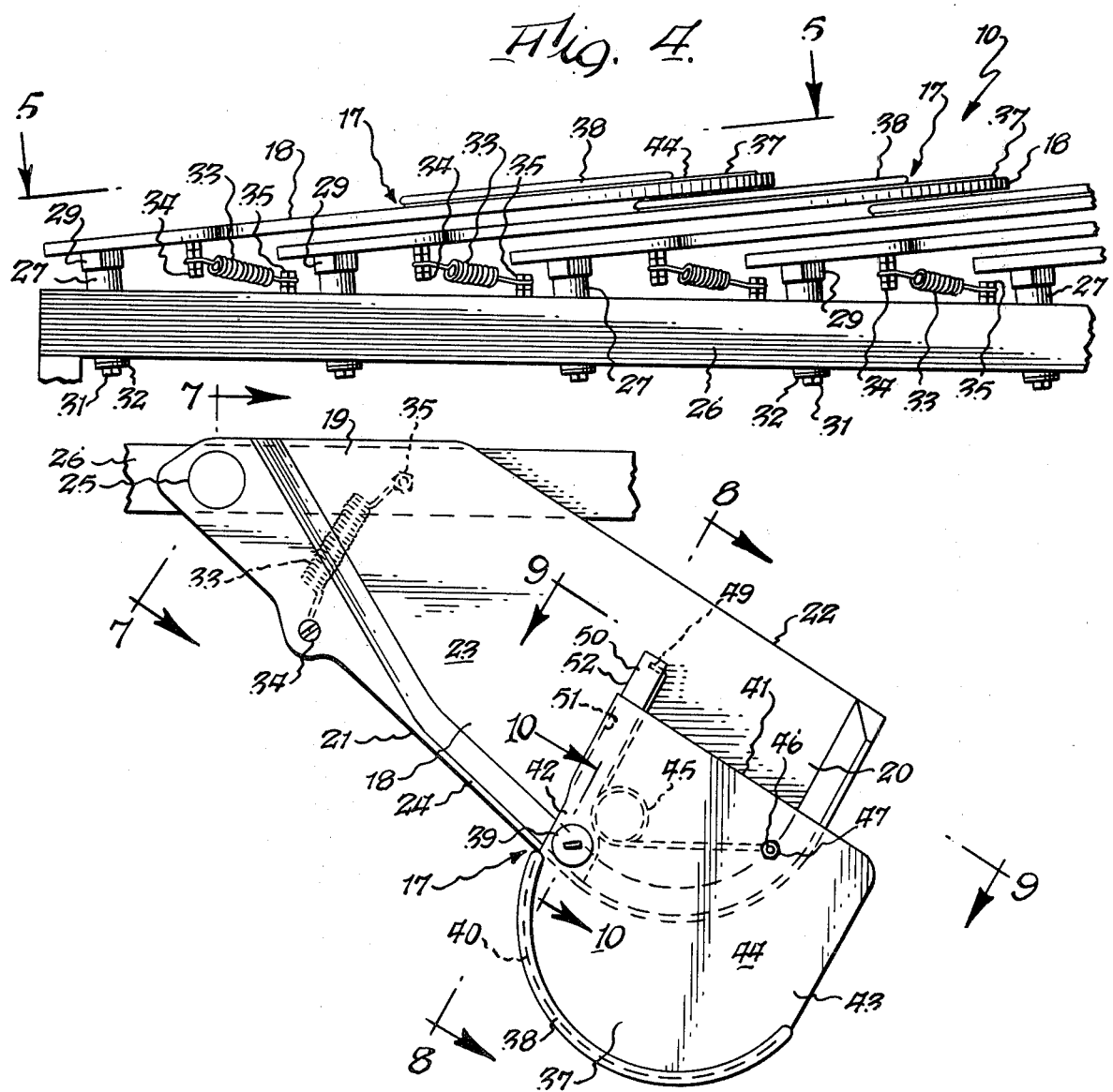

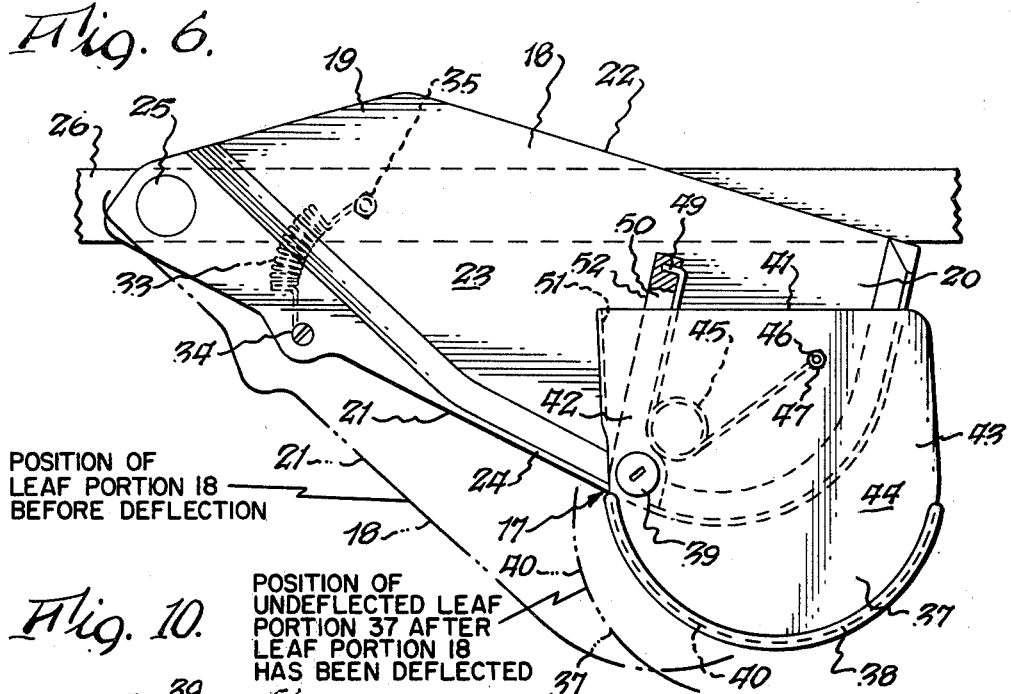
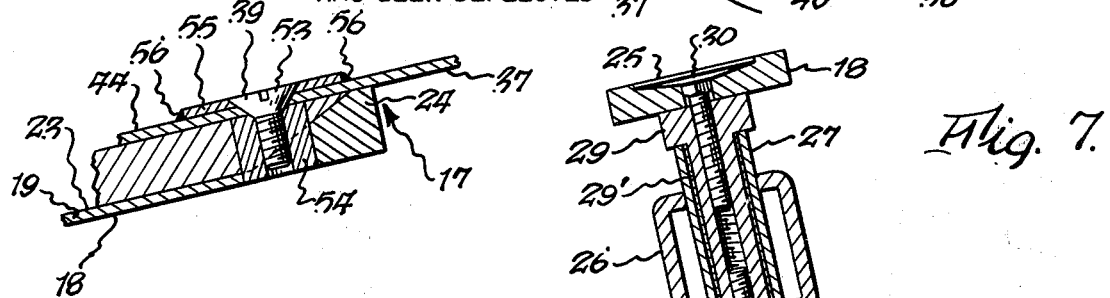
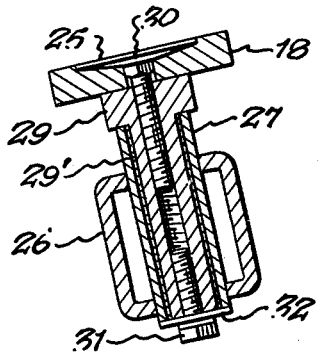
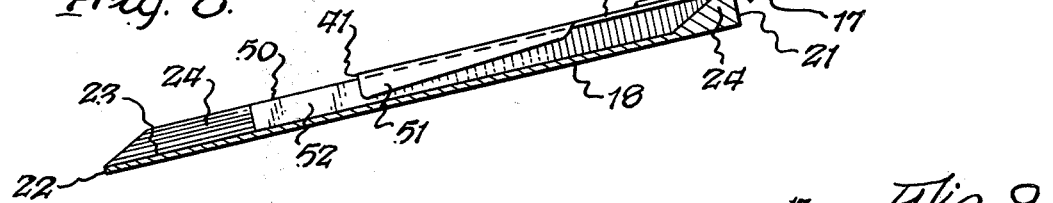
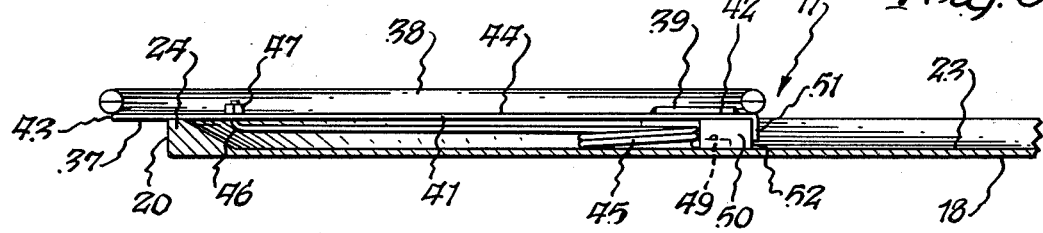

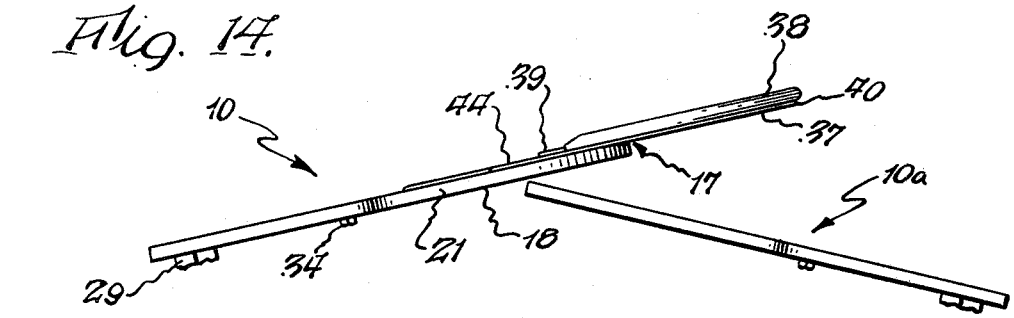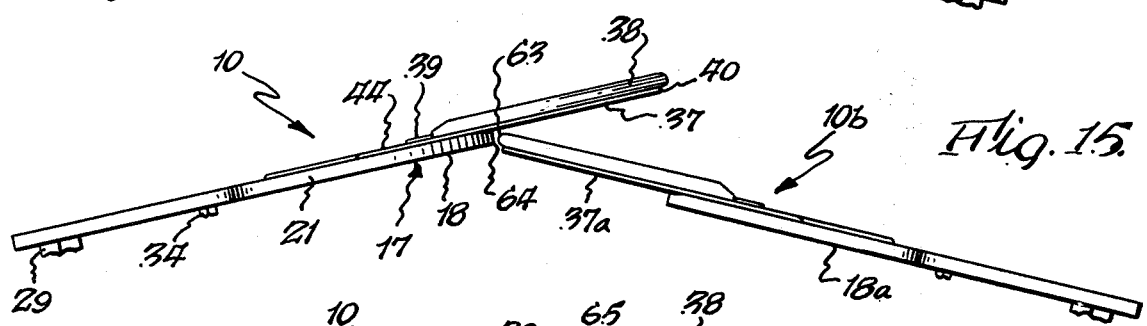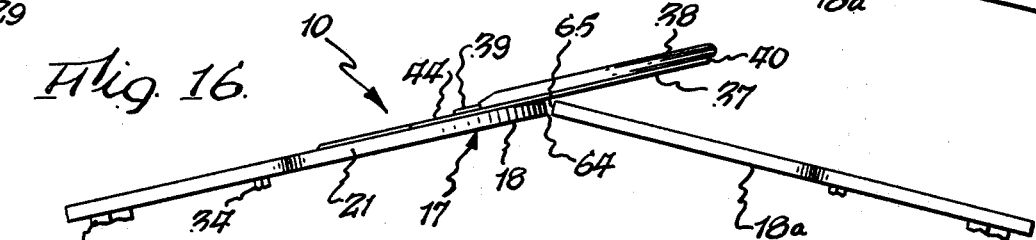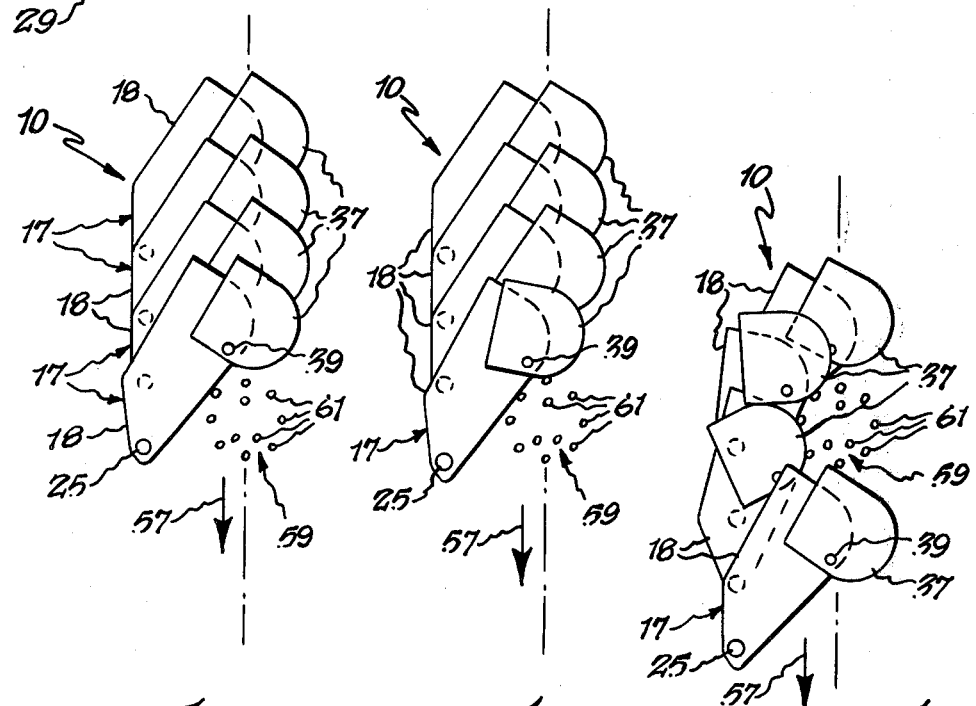

COLLECTOR LEAF CONSTRUCTION FOR HARVESTING MACHINE

BACKGROUND OF THE INVENTION

The present invention relates to an improved collector leaf and an improved collector leaf assembly for use on harvesters for crops such as blueberries.

By way of background, in various types of harvesting machines, such as grape harvesters and blueberry harvesters, collector leaves are used near the bottom of the machine to catch produce which is harvested from the plants. Collector leaves of this type are shown in U.S. Pat. Nos. 3,184,908, 3,225,894 and 3,538,694 and my pending application Ser. No. 703,181, filed July 7, 1976. In the past these leaves have been of various shapes but they had one main deficiency. This deficiency was that when they encountered an object, such as a stalk of a plant or a supporting post, they deflected rearwardly to leave a relatively large opening through which produce dropped onto the ground and was therefore lost from the harvest. It is with overcoming the foregoing deficiency of prior art collector leaves that the present invention is concerned.

SUMMARY OF THE INVENTION

It is accordingly one object of the present invention to provide an improved collector leaf assembly for a harvesting machine which tends to close up gaps which were heretofore experienced in the use of prior collector leaves to thereby reduce the prior ground loss.

Another object of the present invention is to provide an improved collector leaf construction for use with the harvesting machine which is extremely simple and which is highly reliable in operation. Other objects and attendant advantages of the present invention will readily be perceived hereafter.

The improved collector leaf of the present invention comprises a primary leaf portion having an inboard portion and an outboard portion and a first leading edge, first means mounting said inboard portion of said primary leaf portion for movement on the frame of said harvester in response to engaging an obstruction, a secondary leaf portion having a second leading edge, second means mounting said secondary leaf portion on said outboard portion of said primary leaf portion with said second leading edge extending forwardly of said first leading edge at said outboard portion, said second means including means for permitting said secondary leaf portion to move rearwardly upon engaging an obstruction.

The various aspects of the present invention will be more fully understood when the following portions of the specification are read in conjunction with the accompanying drawings wherein:

BRIEF DESCRIPTION OF THE DRAWINGS

FIG. 3 is a fragmentary front elevational view taken substantially along line 3—3 of FIG. 2 and showing an improved collector leaf of the present invention mounted on the harvester frame;

FIG. 4 is a side elevational view of the collector leaves and taken substantially along line 4—4 of FIG. 3;

FIG. 5 is a plan view of the improved collector leaf taken substantially along line 5—5 of FIG. 4;

FIG. 6 is a view similar to FIG. 5 but showing both the primary leaf portion and the secondary leaf portion in deflected positions;

FIG. 7 is a cross sectional view taken substantially along line 7—7 of FIG. 5 and showing the pivotal mounting for the inboard end of the primary leaf portion;

FIG. 8 is a cross sectional view taken substantially along line 8—8 of FIG. 5 and showing the stop structure for limiting pivotal movement of the secondary leaf portion;

FIG. 9 is a fragmentary cross sectional view taken substantially along line 9—9 of FIG. 5 and showing the spring structure for biasing the secondary leaf portion to a normal position;

FIG. 10 is a fragmentary cross sectional view taken substantially along line 10—10 of FIG. 5 and showing the pivotal mounting for the secondary leaf portion;

FIG. 11 is a diagrammatic view showing the normal position of the collector leaves with only the primary leaf portion of the first collector leaf deflected by a blueberry bush;

FIG. 12 is a view similar to FIG. 11 but showing both the primary leaf portion and the secondary leaf portion of the first collector leaf in a deflected position;

FIG. 13 is a view similar to FIG. 12 but showing a plurality of the collector leaves in deflected positions;

FIG. 14 is a front elevational view of a modified form of the present invention utilizing collector leaves of the type shown in FIG. 3 on one side of the harvester and conventional collector leaves on the opposite side;

FIG. 15 is a front elevational view of a further modification of the present invention showing the improved collector leaves of the present invention mounted on both sides of the harvester; and FIG. 16 is a front elevational view of a still further modified form of the present invention wherein the collector leaves of the present invention are mounted on one side of the harvester and conventional leaves are mounted on the other side of the harvester but in a different spaced relationship than shown in FIG. 14.

DESCRIPTION OF THE PREFERRED EMBODIMENTS

Figures 1, 2:
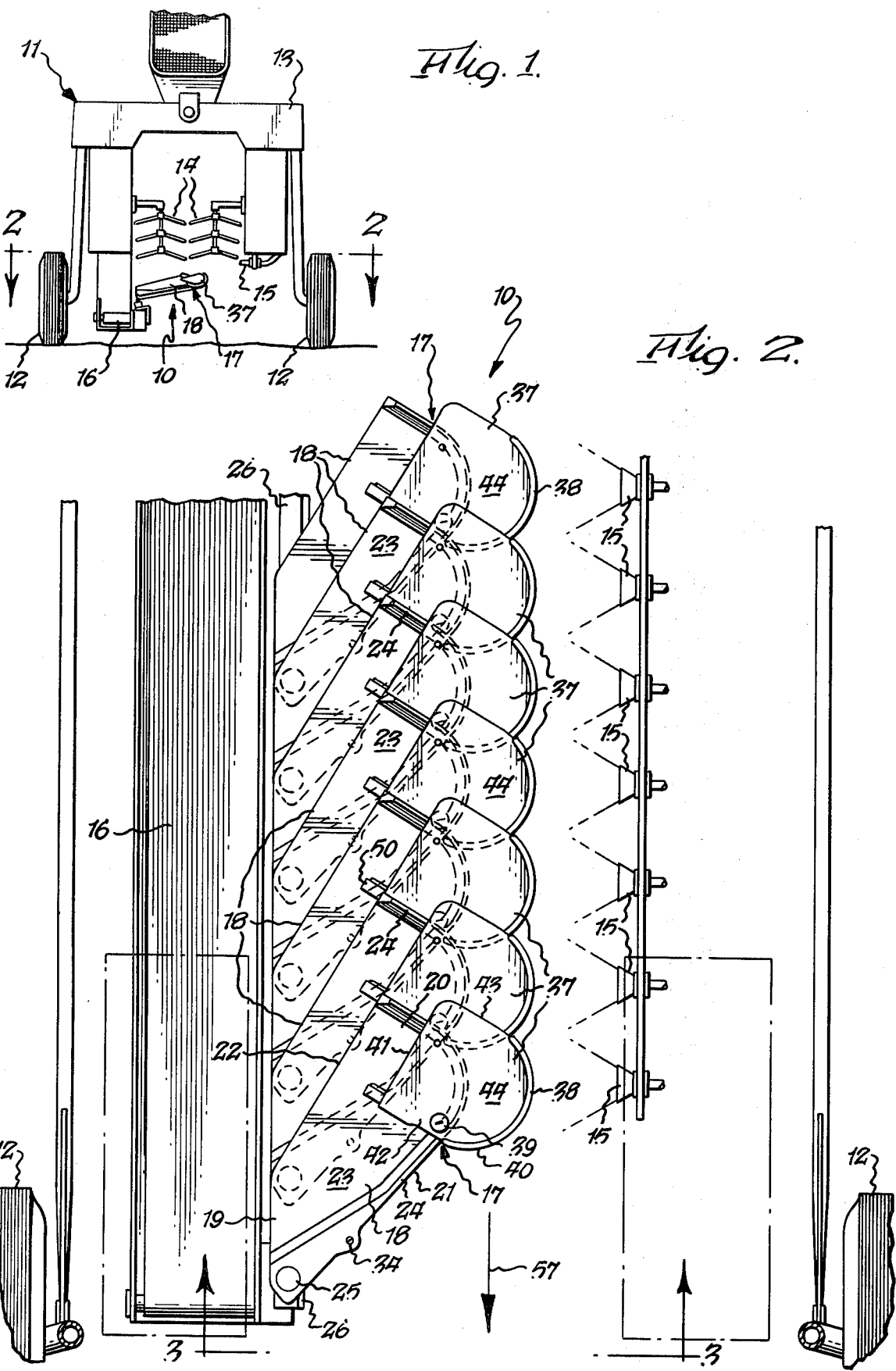
FIG. 1 is a fragmentary front elevational view of the improved collector leaf construction mounted on a harvesting machine of the type used for harvesting blueberries.
FIG. 2 is a fragmentary plan view taken substantially along line 2—2 of FIG. 1.

Broadly, the improved harvesting leaf assembly 10, consisting of a plurality of leaves 17, is mounted on harvester 11 having a plurality of wheels 12 which support frame 13 for movement along the rows of plants to be harvested. In this instance, the plants are blueberry bushes. However, the improved collector leaf assembly can be used for other types of plants including grapevines. The blueberries are dislodged from the berry bushes by means of arm assemblies 14 which rotate freely through the bushes but are vibrated in a horizontal direction to dislodge the berries. Certain of the berries fall directly onto the collector leaf assembly 10 and other berries, which are dropping to the side of the collector leaf assembly, are forced over onto the collector leaf assembly by air jets 15. Thereafter, the berries roll on downwardly inclined leaves of assembly 10 onto conveyor 16 which leads to an elevator conveyor (not shown) which in turns conveys the berries to suitable receptacles. It will be appreciated that the type of harvester being used is shown solely by way of example, and it will further be appreciated that the improved harvesting leaf assembly 10 is intended for use with all suitable types of harvesters.

Each improved harvesting leaf 17 (FIG. 5) includes a primary portion 18 and a secondary portion 37 mounted on the outboard end thereof. Primary portion 18 includes an inboard portion 19, an outboard portion 20, a leading edge 21 and a trailing edge 22, with the foregoing portions essentially defining the periphery of an upper planar surface 23 on which harvested berries will fall. A rib 24 is constructed integrally with primary leaf portion 18 and extends from the forward inboard portion along the leading edge to the outboard portion to lend strength to the leaf. A pivot member 25 mounts the inboard end portion 19 of each leaf portion 18 on harvester frame member 26. The pivotal connection (FIG. 7) essentially includes a sleeve 27 mounted in frame member 26 which receives bearing member 29' which receives post 29 into which upper screw 30 is screwed to hold leaf portion 18 in place. A lower screw 31 is also screwed into post 29 and a washer 32 prevents post 29 from being lifted upwardly. A spring construction 33 has one end anchored to screw 34 on leaf portion 18 and the other end anchored to screw 35 on frame member 26. Spring 33 is of the constant tension type and will always provide the same resistance to pivotal movement of primary leaf portion 18, regardless of the position to which it has been pushed.

A secondary leaf portion 37 is pivotally mounted at 39 on top of each primary leaf portion 18. Each secondary leaf portion 37 includes a leading edge 40, a trailing edge 41, an inboard portion 42 and an outboard portion 43, all which constitute the peirphery of an upper substantially planar surface 44. The leading edge 40 includes a circular rim portion 38 which is essentially a bead of metal secured all along leading edge 40 to provide a blunt edge so that this edge will not damage plants as it engages them. Furthermore, as can be seen from FIGS. 8 and 9, rim 38 extends above surface 44 so as to prevent berries from rolling off of the leading edge. A spring 45 has an end portion 46 which is bent upwardly (FIG. 9) and extends through a hole in leaf portion 37 and receives nut 47 to retain it in position. The other end of spring 45 is bent into a foot 49 which is received in an aperture of bar 50 (FIG. 6) glued to surface 23. When spring 45 is allowed to expand to its normal position, secondary leaf portion 37 will occupy the position shown in FIG. 5 wherein flange 51 (FIGS. 8 and 9) is biased against side 52 of block 50.

The pivotal mounting 39 (FIG. 10) between secondary leaf portion 37 and primary leaf portion 18 (FIG. 10) consists of a screw 53 which is received in threaded bushing 54 anchored to primary leaf portion 18. The head of screw 39 is welded to a washer 55 which in turn is welded at 56 to secondary leaf portion 37. Secondary leaf portion 37 is installed by rotating it as a unit with screw 39 to cause screw 39 to thread itself into bushing 54. Thereafter, spring 45 is installed in the position shown in FIG. 5. If for any reason it becomes necessary to remove secondary leaf portion 37, all that is necessary is to remove spring 45 and thereafter rotate secondary leaf 37 in the proper direction to unthread screw 39.

It is to be noted that spring 45 is weaker than spring 33. Therefore, as secondary leaf portion 37 is pivoted by an obstruction, primary leaf portion 18 will not be pivoted until it encounters that obstruction. Thus, rim 38 of secondary leaf portion 37 can pivot until its leading edge portion 38 substantially coincides with the portion of leading edge 24 below it. Furthermore, there will be situations where both leaf portions encounter different obstructions simultaneously (FIG. 6) whereupon they will both deflect to new positions. It will be appreciated, however, that both leaf portions will deflect only an amount governed by the position of the obstructions which they engage.

The improved collector leaf assembly 10 (FIG. 1) of the present invention, consisting of improved collector leaves 17, functions to prevent large amounts of unrecoverable produce from dropping to the ground when the collector leaves are deflected during harvesting. In this respect, it can be seen from FIG. 11 that as the harvester moves forwardly in the direction of arrow 57 (FIGS. 2 and 11), the blueberry bush 59 will engage leading edge 21 of the first primary leaf portion 18 and cause it to deflect. However, there may be a point where secondary leaf portion 37 has not yet been engaged by the branches 61 of bush 59. Therefore, secondary leaf portion 37 will at this time maintain the same relative position with respect to primary leaf portion 18 as it did before the latter was deflected. Since secondary leaf portion 37 extends forwardly of the leading edge of primary leaf portion 18 under the foregoing circumstances, the secondary leaf portion 37 will occupy a position no longer occupied by the deflected primary collector leaf portion beneath it and will therefore catch berries falling into this position. In addition, since each secondary leaf portion 37 extends into areas not occupied by the primary leaf portions even when the latter are undeflected, a greater catching surface is provided than if secondary leaf portions 37 were not present.

As the machine moves forwardly to the position of FIG. 12, the forwardmost secondary collector leaf portion 37 will deflect because it will engage the branches 61 of plant 59 but it will still cover an area not covered by forwardmost primary leaf portion 18, which has been deflected further. Thereafter, as can be seen from FIG. 13, the plurality of secondary leaf portions 37 in conjunction with the primary leaf portions 18 will tend to provide a greater surface for receiving falling blueberries than if the secondary leaf portions 37 were not present and the primary leaf portions 18 were deflected by the branches. This can be readily visualized by viewing FIG. 13 and considering the coverage if ry leaf portion 18. Considering this feature and viewing FIGS. 2 and 4 it will be appreciated that an excellent stacking action among the various leaves 17 is obtained without interference therebetween as they swing during operation. It is also to be noted that the leading edge 38 is substantially circular, as this has been found to give maximum coverage in the instant construction.

It has been found in experience that previously the ground loss of blueberries was between 35% and 50%, that is, 35% to 50% of the berries from the bushes fell to the ground and were not harvested. With the use of the improved collector leaf assembly of the present invention, the amount of ground loss has been dropped to approximately 15%. In other words, there has been an extremely significant amount of blueberries which have been saved from ground loss by the use of the improved collector leaf assembly of the present invention.

While the embodiment shown in FIG. 1 discloses the improved collector leaf assembly only on one side of the harvester, it will be appreciated that collector leaves can be used on both sides. In this respect, in FIG. 14 one embodiment is shown wherein the improved collector leaf assembly 10 of the present invention is shown mounted on one side of the machine and a conventional collector leaf assembly 10a is mounted on the other side of the machine. Collector leaf assembly 10a is essentially the mirror image of the primary collector leaf portions 18 of FIG. 2, that is, without the secondary collector leaf portions 37 mounted thereon.

In FIG. 15 a further modified embodiment of the present invention is shown wherein one side of the machine mounts collector leaves 17 consisting of primary leaf portions 18 and secondary leaf portions 37, as described above relative to FIG. 5, and the other side of the machine mounts an assembly 10b consisting of primary leaf portions 18a and secondary leaf portions 37a mounted thereon with the leaf assembly 10b being essentially the mirror image of assembly 10 but being oriented so that the outer edges 63 of secondary leaf portions 37a are adjacent the outer edge portions 64 of primary leaf portions 18. In essence, therefore, secondary leaf portions 37 overlie secondary leaf portions 37a.

In FIG. 16 a further modified collector leaf assembly is disclosed wherein one side of the machine mounts the improved collector leaf assembly 10 (FIG. 2) which includes primary leaf portions 18 mounting the secondary leaf portions 37, as described above. However, the other side of the machine mounts a plurality of primary leaf portions 18a without the secondary leaf portions 37 mounted thereon. However, the embodiment of FIG. 16 varies from that of FIG. 14 inasmuch as the outer end 65 of each leaf portion 18a is adjacent the outer end 64 of primary leaf portion 18, whereas in FIG. 14 the outboard end of primary leaf portion 18 is in overlying relationship to the outboard end of leaf 18a. It is to be again noted that in FIGS. 14, 15 and 16 there is a collector leaf assembly on both sides of the machine, that is, each side mounts a plurality of leaves, for example, each side may mount fourteen leaves. In the embodiment of FIG. 2, fourteen leaves are mounted on one side of the machine. In all embodiments of the invention any suitable number of leaves may be used, as required.

It can thus be seen that the improved collector leaf construction of the present invention is manifestly capable of achieving the above-enumerated objects and while preferred embodiments of the present invention have been disclosed, it will be appreciated that the present invention is not limited thereto but may be otherwise embodied within the scope of the following claims.

What is claimed is:

1. A collector leaf for a harvester comprising a primary leaf portion having a leading edge and a trailing edge and an inboard portion and an outboard portion, first mounting means on said inboard portion for pivotally mounting said primary leaf portion on a harvester, a secondary leaf portion having an inboard portion and an outboard portion and a leading edge and a trailing edge, second mounting means for mounting said secondary leaf portion on the outboard end of said primary leaf portion with said inboard portion of said secondary leaf portion and said outboard portion of said primary leaf portion being in relative overlapping relationship with said leading edge of said secondary leaf portion extending forwardly of said leading edge of said primary leaf portion in the area of said overlapping relationship, said second mounting means including means for permitting said secondary leaf portion to move toward said trailing edge of said primary leaf portion when said leading edge of said secondary leaf portion engages a foreign object during forward movement of said harvester.

2. A collector leaf as set forth in claim 1 wherein said second mounting means comprises a pivotal connection located substantially at the junction of said leading edge of said primary leaf portion and said inboard edge of said secondary leaf portion.

3. A collector leaf as set forth in claim 1 wherein said second mounting means comprises a pivotal connection between said primary leaf portion and said secondary leaf portion and spring means for biasing said secondary leaf portion to a position forwardly of said leading edge of said primary leaf portion at the area of said overlapping relationship.

4. A collector leaf as set forth in claim 3 including stop means for limiting the movement of said secondary leaf portion under the bias of said spring means.

5. A collector leaf as set forth in claim 4 including second stop means for limiting the movement of said secondary leaf portion against the bias of said spring means.

6. A collector leaf as set forth in claim 3 including rim means on said leading edge of said secondary leaf portion for causing said leading edge to be relatively blunt.

7. A collector leaf as set forth in claim 6 wherein said rim means extends upwardly above the surface of said secondary leaf portion to act as a stop for harvested material thereon.

8. A collector leaf as set forth in claim 1 including first spring means for biasing said primary leaf portion into an undeflected position, second spring means interposed between said primary leaf portion and said secondary leaf portion for biasing said secondary leaf portion to an undeflected position, said first spring means being stronger than said second spring means to permit said secondary leaf means to deflect more easily than said primary leaf means.

9. A collector leaf as set forth in claim 8 wherein said second mounting means comprises a pivotal connection located substantially at the junction of said leading edge of said primary leaf portion and said inboard edge of said secondary leaf portion.

10. A collector leaf assembly for a harvesting machine comprising harvesting machine frame means, a plurality of aligned collector leaves each including a primary portion having leading and trailing edges and inboard and outboard ends, means pivotally mounting said inboard ends on said harvesting machine frame means with said trailing edges of more forwardly disposed primary leaf portions and the leading edges of next adjacent primary leaf portions being in overlapping relationship, a plurality of secondary leaf portions each having a leading edge and trailing edge and an inboard end and an outboard end, means pivotally mounting each of said secondary leaf portions on an outboard end of each of said primary leaf portions with the trailing ends of said secondary leaf portions and the outboard ends of the primary leaf portions on which they are mounted being in overlapping relationship and with said secondary leaf portions extending forwardly of the portions of the leading edges of said primary leaf portions on which they are mounted, and each of said trailing edges of said secondary leaf portions also being in overlapping relationship relative to the leading edges of the next adjacent more rearwardly disposed secondary leaf portions, first spring means coupled between said primary leaf portions and said harvester frame means for biasing said primary leaf portions in the direction of harvester machine travel, and second spring means effectively interposed between each of said primary leaf portions and each of said secondary leaf portions mounted thereon for biasing said secondary leaf portions in the direction of harvesting machine travel, said second spring means being weaker than said first spring means.

11. A collector leaf for a harvester comprising a primary leaf portion having an inboard portion and an outboard portion and a first leading edge, first means mounting said inboard portion of said primary leaf portion for movement on the frame of said harvester in response to engaging an obstruction, a secondary leaf portion having a second leading edge, second means mounting said secondary leaf portion on said outboard portion of said primary leaf portion with said second leading edge extending forwardly of said first leading edge at said outboard portion, said second means including means for permitting said secondary leaf portion to move rearwardly upon engaging an obstruction.

12. A collector leaf as set forth in claim 11 wherein said second means comprises a pivotal connection between said primary and secondary leaf portions.

13. A collector leaf as set forth in claim 12 wherein said second leading edge comprises the arc of a circle.

14. A collector leaf as set forth in claim 12 wherein said second means comprises means for causing said secondary leaf portion to move in substantially coplanar relationship relative to said first leaf portion.

15. A collector leaf as set forth in claim 14 wherein said secondary leaf portion includes a second inboard portion, and wherein said second means comprises a pivotal connection substantially between said outboard portion of said primary leaf portion and said inboard portion of said secondary leaf portion.

16. A collector leaf as set forth in claim 15 wherein portions of said first leading edge and said second leading edge intersect, and wherein said pivotal connection is located substantially at the area at which said leading edges intersect.

17. A collector leaf assembly for a harvesting machine comprising a harvesting machine frame; first and second rows of aligned collector leaves extending in side-by-side relationship longitudinally on said frame, said first row including collector leaves each having a primary leaf portion having a first inboard portion and a first outboard portion and a first leading edge, first means mounting said first inboard portion for movement on the frame of said harvester in response to engaging an obstruction, a secondary leaf portion having a second leading edge, second means mounting said secondary leaf portions on said outboard portions of said primary leaf portions with said second leading edges extending forwardly of said first leading edges at said outboard portions, said second means including means for permitting said secondary leaf portions to move rearwardly upon engaging an obstruction, and said second row including a plurality of second collector leaves having second inboard portions and second outboard portions, said secondary leaf portions and said second outboard portions being in overlapping relationship.

18. A collector leaf as set forth in claim 17 including second secondary leaf portions mounted on said second outboard portions, with said secondary leaf portions and said second secondary leaf portions being in overlapping relationship.

* * * * *

UNITED STATES PATENT AND TRADEMARK OFFICE
CERTIFICATE OF CORRECTION

PATENT NO. : 4,150,526

DATED : April 24, 1979

INVENTOR(S) : Charles G. Burton

It is certified that error appears in the above-identified patent and that said Letters Patent are hereby corrected as shown below:

Column 4, line 45, after "if" delete "ry", and insert the following:

--secondary leaf portions were not present.

It is to be especially noted that the axis of pivot 39 is substantially parallel to the axis of pivot 25, and therefore secondary leaf portion 37 will pivot in substantially the same plane as primary--.

Signed and Sealed this

Thirty-first Day of July 1979

[SEAL]

Attest:

Attesting Officer

LUTRELLE F. PARKER
*Acting Commissioner of Patents and Trademarks*